United States Patent
Birch et al.

(10) Patent No.: US 7,184,534 B2
(45) Date of Patent: Feb. 27, 2007

(54) USING A TELEPHONY APPLICATION SERVER FOR CALL CONTROL WITH A VOICE SERVER

(75) Inventors: Oliver Birch, Annapolis, MD (US); Thomas E. Creamer, Boca Raton, FL (US); Joseph H. McIntyre, Austin, TX (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 10/325,996

(22) Filed: Dec. 19, 2002

(65) Prior Publication Data

US 2004/0120473 A1  Jun. 24, 2004

(51) Int. Cl.
*H04M 3/42* (2006.01)

(52) U.S. Cl. .............................. 379/211.01; 379/88.17; 379/219; 379/220.01; 379/221.06; 455/417; 709/227

(58) Field of Classification Search ............ 379/88.17, 379/220.01, 221.01, 221.02, 221.06, 211.01, 379/219; 455/417; 704/270.1; 709/227; 719/314
See application file for complete search history.

(56) References Cited

U.S. PATENT DOCUMENTS 6,269,254 B1    7/2001  Mathis .................... 455/557
6,647,111 B1*  11/2003  Bjornberg et al. ..... 379/220.01
2001/0028654 A1  10/2001  Anjum et al. .............. 370/401
2004/0101122 A1*  5/2004  Da Palma et al. .......... 379/219
2005/0080905 A1*  4/2005  Dolinar et al. ............. 709/227

FOREIGN PATENT DOCUMENTS

| EP | 0957621     | 11/1999 |
| EP | 1164771     | 12/2001 |
| WO | WO 98/16051 | 4/1998  |
| WO | WO 00/42760 | 7/2000  |
| WO | WO 01/76154 | 10/2001 |

OTHER PUBLICATIONS

U.S. Appl. No. 09/576,166, filed May 22, 2000, Ringhof et al.
U.S. Appl. No. 09/946,437, filed Sep. 6, 2001, Creamer et al.
*Method of Converting the CallPath Architecture to the JTAPI Architecture*, IBM Research Disclosure, No. 410, Art. 135, pp. 818-821, (Jun. 1998).
*JAVA™ Call Control (JCC) and Session Initiation Protocol (SIP)*, IEICE Trans. Commun., vol. E84-B, No. 12, pp. 3096-3097, (Dec. 2001).
*Next Generation Service Creation Using XML Scripting Languages*, 2002 Int'l Conf. on Communications, vol. 4, pp. 2001-2007, (2002).

* cited by examiner

*Primary Examiner*—Gerald Gauthier
(74) *Attorney, Agent, or Firm*—Akerman Senterfitt

(57) ABSTRACT

A method of linking call control functions of a telephony server with voice processing functions of a voice server using a common server side program can include receiving a call in the voice server, invoking the server side program to generate a voice processing script, executing the voice processing script in the voice server to process the call, and sending the call to the telephony server to perform a call control function on the call. The call control function can be indicated by the server side program.

23 Claims, 2 Drawing Sheets

USING A TELEPHONY APPLICATION SERVER FOR CALL CONTROL WITH A VOICE SERVER

BACKGROUND OF THE INVENTION

1. Technical Field

This invention relates to the field of telephony and, more particularly, to linking telephony service platforms and call control platforms.

2. Description of the Related Art

Within telecommunications networks, telephony services dealing with speech processing typically are provided by a voice processing node. The voice processing node can be computer-based application platform which connects with the conventional circuit-switched telephony network through a suitable gateway interface. To facilitate rapid application development, an increasing number of such voice processing nodes have the ability to execute scripting languages. A variety of different scripting languages suited for the development of voice processing services have emerged which allow developers to quickly bring to market various interactive voice processing and voice response services.

One type of voice processing node is a voice server. A voice server can include a speech recognition engine, a text-to-speech engine, a voice browser which can execute voice processing scripts, as well as interfaces to various telephony platforms. For example, International Business Machines (IBM) Corporation of Armonk, N.Y. provides a voice server product known as IBM WebSphere® Voice Server which performs the functions described.

A telephony application platform within the telecommunications network is a computer-based application platform which can communicate with the circuit switched telecommunications network via a suitable gateway interface similar to a voice server. A telephony application platform, however, can provide call control functions as well as integrate other business and electronic commerce applications. For example, IBM Corporation provides a telephony application platform known as IBM WebSphere® Telecom Application Server which functions substantially as described.

While voice servers have come to rely upon scripted applications to facilitate timely service deployment, telephony application platforms utilize other open standards for providing functionality. More particularly, telephony application platforms typically provide an application platform having a virtual machine capable of executing applications written in an open standard programming language such as JAVA. Although telephony application platforms can be implemented which execute scripting languages such as Call Control Extensible Markup Language (CCXML) which support call control functions, still, such telephony application platforms must implement execution environments which differ substantially from the execution environment provided by a voice processing node.

Accordingly, telephony services which provide both voice services as well as call control functionality utilize both a voice processing node and a telephony application platform. In order for each node to work cooperatively with the other, however, a developer essentially must design and build two different applications, one for use in the voice processing node and the other for use in the telephony application platform. The need to design two different applications stems largely from the fact that each node utilizes a different application platform to provide functionality. While the voice server processes scripts such as Voice Extensible Markup Language (VXML) documents or applications, the telephony application platform executes functionally different scripts and/or open standard language applications which require a virtual machine.

Not only are individual applications necessary for each telephony node, but in order to develop the applications, developers require two different application development environments. Developers require a development environment suited for the development of voice processing scripts for the voice processing node and a development environment having reusable software components and a virtual machine to develop applications for the telephony application platform.

SUMMARY OF THE INVENTION

The present invention provides a solution for using a telephony application platform with a voice services platform. More particularly, rather than developing an application to control the telephony application platform, a separate application to control the voice services platform, and designing both applications to function cooperatively with one another using two different application development environments, the present invention provides a solution for controlling both platforms through a single controlling application. In consequence, telephony services which utilize both call control and voice services can be developed in a single development environment despite the fact that the application can control two independent application platforms or telephony processing nodes.

One aspect of the present invention can include a method of linking call control functions of a telephony server with voice processing functions of a voice server. The method can include receiving a call in the voice server and invoking a server side program to generate a voice processing script. The voice processing script can be executed in the voice server to process the call. An identifier indicating that a call control function is required for the call can be detected in the voice processing script. Accordingly, the call can be ended in the voice server.

The call can be sent to the telephony server to perform the call control function on the call, wherein the call control function is indicated by the server side program. Within the telephony server, the call can be received from the voice server. The telephony server can receive call control information from the server side program for performing the call control function and perform the call control function on the call. The method also can include providing an application development environment for specifying the server side program.

Another aspect of the present invention can include a method of linking call control functions of a telephony server with voice processing functions of a voice server. The method can include executing a server side program to generate a voice processing script having an identifier specifying a call control function available from the telephony server for processing a call and providing the voice processing script to the voice server for execution. The voice processing script can be executed within the voice server and the identifier of the voice processing script can be detected. The call can be ended in the voice server.

The call and the detected identifier can be sent to the telephony server so that the telephony server can perform the call control function specified by the identifier. Within the telephony server, the call can be received from the voice server, call control information from the server side program can be received for performing the call control function, and the call control function can be performed on the call. The method further can include providing an application development environment for specifying the server side program.

Another aspect of the present invention can include a call processing environment having a server side program configured to interact with a telephony application server and to generate a voice processing script. The voice processing script generated by the server side program can include an identifier indicating that a call control function is needed to process a call. The telephony environment also can include a voice server configured to execute the voice processing script to process a call. The voice server further can be configured to detect the identifier of the voice processing script and route the call to a telephony server.

The telephony server can be configured to execute a call control function for the call under the direction of the server side program. For example, according to one embodiment of the present invention, the voice server can provide the detected identifier to the telephony server. The telephony server can be configured to determine the call control function from the identifier received from the voice server. In another embodiment, the telephony server can be configured to determine the call control function from information received from the server side program.

BRIEF DESCRIPTION OF THE DRAWINGS

There are shown in the drawings, embodiments-which are presently preferred, it being understood, however, that the invention is not limited to the precise arrangements and instrumentalities shown.

DETAILED DESCRIPTION OF THE INVENTION

The present invention provides a method, system, and apparatus which allows a telephony application to function cooperatively and seamlessly with a voice processing platform under the control of a single, common application. Thus, the telephony application platform which can provide call control functions and the voice services platform which can provide voice processing functions can be controlled through a single application, thereby eliminating the need to develop a separate application for each platform.

Figure 1:
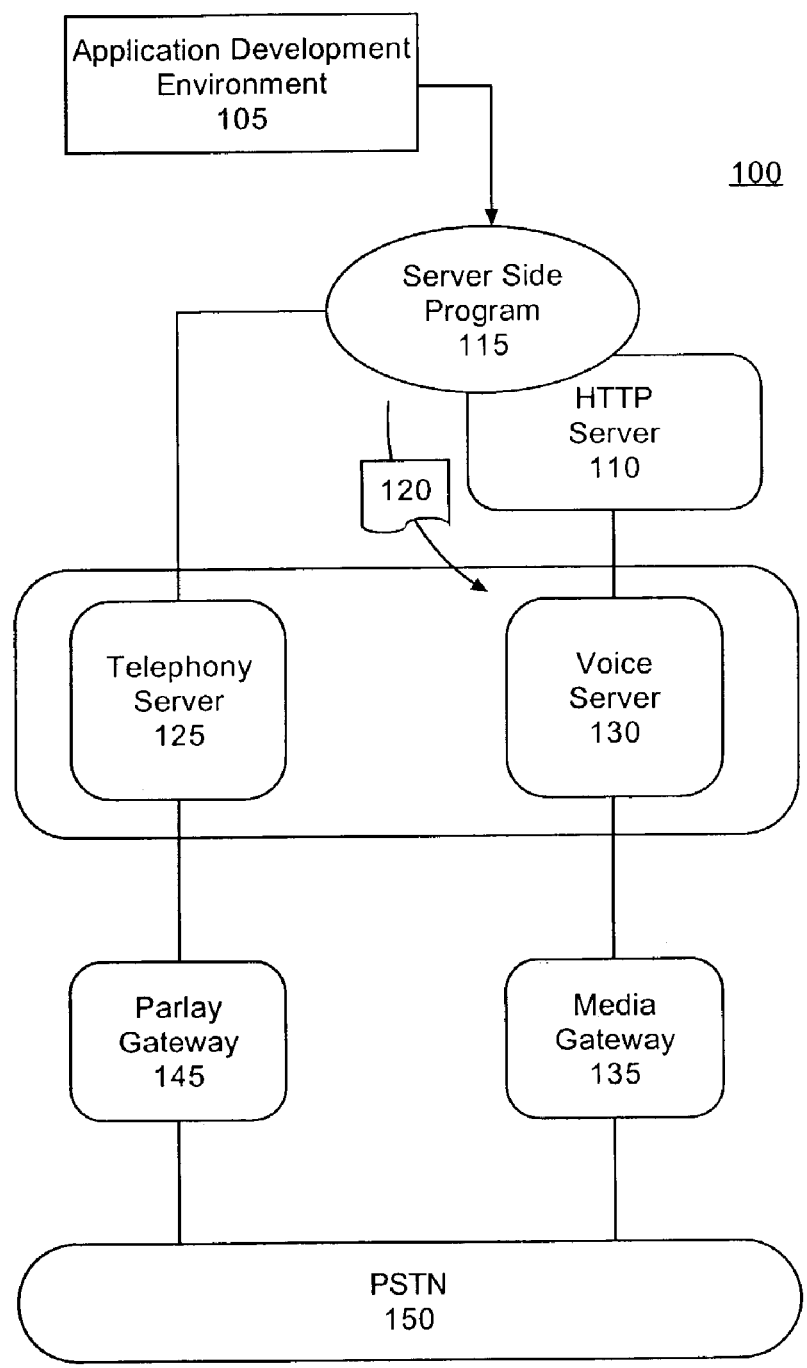
FIG. 1 is a schematic diagram illustrating an exemplary call processing system in accordance with the inventive arrangements disclosed herein.

FIG. 1 is a schematic diagram illustrating a telephony system 100 in accordance with the inventive arrangements disclosed herein. The telephony system 100 can include an application development environment (ADE) 105, a Hypertext Transfer Protocol (HTTP) server 110, a telephony server 125, and a voice server 130. The telephony server 125 and the voice server 130 can be connected to the public switched telephone network (PSTN) 150 as well as other telecommunications networks as will be discussed in greater detail.

The telephony server 125 can provide call control functions in a packet-switched telephony environment. The telephony server 125 can be a server or other computer system providing an application platform for various call control applications and functions. For example, the telephony server 125 can host telephony call control applications for performing call routing, redirection, and the like. The telephony server 125 can provide an application execution environment having a virtual machine for executing applications coded in various open standard languages. For example, the telephony server 125 can provide a JAVA execution environment. Thus, the telephony server 125 can provide a variety of reusable software components which are configured to perform various call control functions. For example, the telephony server 125 can include one or more JAVA Beans configured to perform call control functions which can be invoked to process a call.

According to one embodiment of the present invention, the telephony server 125 can be implemented as the WebSphere® Telecom Application Server, which is commercially available from International Business Machines (IBM) Corporation of Armonk, N.Y. The WebSphere® Telecom Application server supports a variety of emerging open application programming standards such as JAVA and Parlay/Open Service Access to communicate with various gateways for connection to the PSTN 150.

The telephony server 125 can connect with the PSTN 150 via a Parlay compliant gateway (Parlay gateway) 145. Parlay specifies an open application programming interface (API) for managing network "edge" services such as call control. Accordingly, the Parlay gateway 145 can serve as an interface between the circuit-switched environment of the PSTN 150 and the packet-switched network in which the telephony server 125 exists. Although not shown, it should be appreciated that through the Parlay gateway 145, the telephony server 125 can be communicatively linked with various other communications networks, whether circuit switched or packet switched, as specified by the Parlay Specification through a suitable switching system. For example, the Parlay Gateway 145 can provide connectivity to Session Initiation Protocol (SIP) proxies, mobile networks, service switching points, electronic mail servers, Wireless Application Protocol (WAP) proxies, and the like. Accordingly, the telephony server 125 can provide call control functions for calls originating in any of a variety of telecommunications networks, including the PSTN 150, via the Parlay gateway 145.

The telephony server 125 can send and receive both telephony audio information and telephony signaling information via the Parlay gateway 145. More particularly, the telephony server 125 can communicate with the Parlay gateway 145 using Common Object Request Broker Architecture (CORBA). For example, the telephony server 125 can communicate with the Parlay gateway 145 using JAVA Remote Method Invocation (RMI) over Internet Inter-Orb Protocol (IIOP) to deliver CORBA distributed computing capabilities on a JAVA platform.

The voice server 130 can include a voice browser, a text-to-speech (TTS) engine for converting text to speech, and a speech recognition engine (SRE) for converting speech to text. The voice server 130 can be implemented as a computer system or server which is configured to execute one or more applications or scripts. The voice server 130 provides an application execution platform having speech generation and speech processing resources. For example, the voice services platform 130, responsive to receiving a call, can load and execute a voice processing script within the voice browser. The voice processing script can be determined, at least in part, with reference to the called number specified by telephony signaling information for a received call. The TTS engine and the SRE can be accessed by the voice browser to perform speech recognition and text-to-speech tasks as may be required in executing the voice processing script.

The voice server 130 can send and receive both telephony audio information and telephony signaling information via the media gateway 135. The voice server 130 also can communicate with the HTTP server 110 using a suitable data communications protocol. One example of a voice server 130 which is capable of performing the functions substantially as described herein can be the WebSphere® Voice Server which is commercially available from IBM Corporation.

The media gateway 135 serves as an interface between the circuit-switched environment of the PSTN 150 and the packet-switched network in which the voice server 130 exists. The media gateway 135 can serve as a termination point for one or more T1 links received from a switching system of the circuit switched telephony network for receiving telephony audio and signaling information. The T1 lines can support Channel Associated Signaling (CAS). Telephony audio and signaling information received over the T1 links can be translated or format converted for use over a packet switched network by telephony nodes, such as the voice server 130, operating therein.

Accordingly, the media gateway 135 can communicate with the voice server 130 over a data communications link using Media Gateway Control Protocol (MGCP) which provides a mechanism for controlling Voice over Internet Protocol (IP) gateways from external call control elements. MGCP assumes a call control architecture in which the call control intelligence resides and is handled external to the media gateway 135. Telephony audio can be exchanged between the media gateway 135 and the voice services platform 130 over packet switched data communications links using Real Time Transport Protocol (RTP).

The ADE 105 is an application development environment through which developers are provided one or more functions, debugging tools, simulation tools, and the like, for developing server side programs. More particularly, the ADE 105 facilitates the development of a server side program which can dynamically generate a voice processing script 120, for example a Voice Extensible Markup Language (VXML) script, which can be executed within a voice browser of the voice server 130. The ADE 105 also can include a virtual machine for testing and debugging server side programs, such as server side program 115, which can require a virtual machine for execution.

The server side program 115 can be executed within the HTTP server 110. According to one embodiment of the present invention, the server side program 115 can be written in a programming language such as JAVA. Accordingly, the HTTP server 110 can include a virtual machine for executing server side program 115. Notably, in addition to generating a voice processing script 120, the server side program 115 also can provide direction to the telephony server 125. That is, the server side program 115, during execution, can generate a voice processing script 120 which can be provided to the voice server 130 as well as provide instructions to the telephony server 125 for processing a same call, for example, in the event the call is transferred to the telephony server 125 from the voice server 130 for further processing.

The ADE 105 allows a developer to design the server side program 115 which can provide both voice services as well as call control functions. That is, the server side program 115 can control both the voice server 130 and the telephony server 125. The voice processing script 120 which is dynamically generated by the server side program 115 can be provided to the voice server 130 for execution within the voice browser incorporated therein. Notably, the voice processing script 120 generated by the server side program 115 can include one or more identifiers which indicate to the voice server 130, when detected, that call control functions are required to properly process a given call. The identifiers, which can be implemented as defined tags or as data set off using defined tags within the voice processing script, can indicate to the voice server 130 that the call being serviced can be terminated and transferred to the telephony server 125 for further processing.

According to one embodiment of the present invention, the identifiers within the voice processing script can indicate a need for further processing but not which call control functions are to be applied to a call. In that case, the server side program 115 can provide call processing information to the telephony server 125 indicating which call control function or functions are to be performed for a given call. In another embodiment, more than one identifier can be used such that each identifier, while indicating that call processing is needed, also can indicate one or more particular call control functions to be implemented. In that case, the identifier or identifiers detected by the voice server 130 can be transferred to the telephony server 125 as a call parameter which can be matched to one or more call control functions to be applied to the transferred call.

Figure 2:
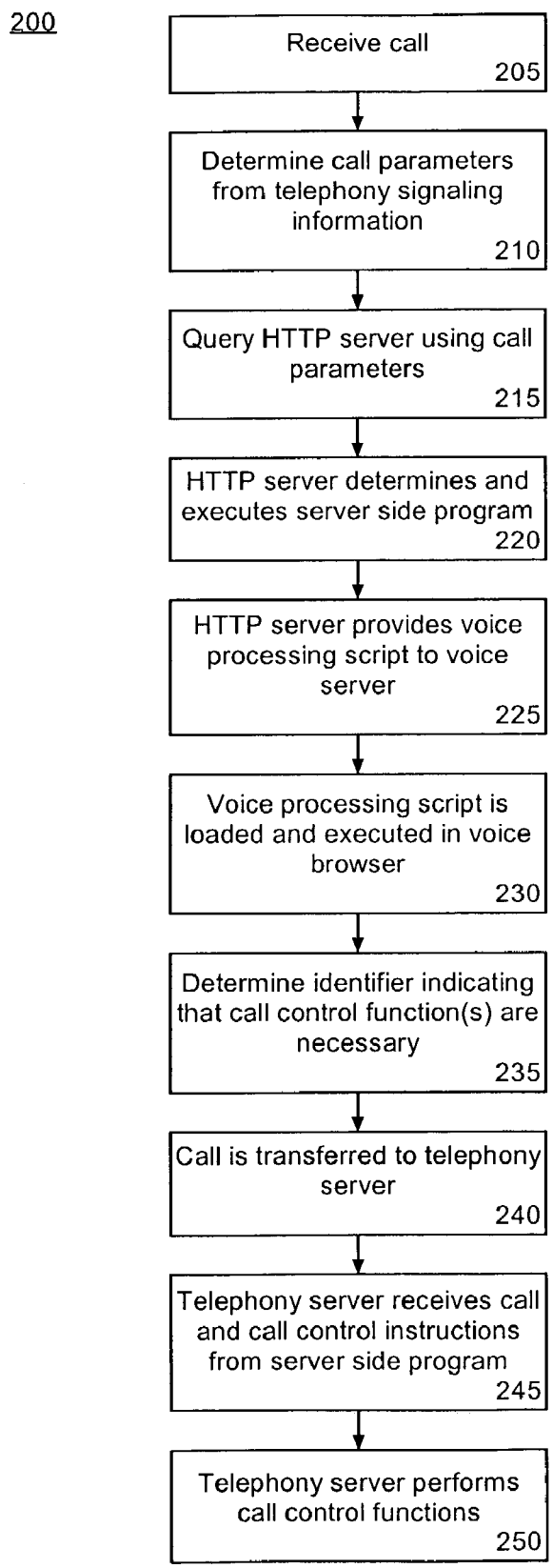
FIG. 2 is a flow chart illustrating a method of call processing using the system of FIG. 1.

FIG. 2 is a flow chart illustrating a method 200 of handling calls using the system of FIG. 1. The method can begin in step 205 where a call can be received by the voice server. The call can be routed through the PSTN to a switching system which can determine that the call is to be processed by the voice server. For example, the called number specified by the call request can correspond to a number allocated to the voice server. The call can be provided to the media gateway, which then can provide the call to the voice server. It should be appreciated, however, that the call also can originate from a subscriber that is connected to a packet switched telephony network.

The voice server, over packet switched communication links, can receive telephony audio information as well as telephony signaling information for the call from the media gateway. Accordingly, in step 210, the voice server can determine or identify one or more call parameters for the call such as the called number, the calling number, as well as additional subscriber information specified by the telephony signaling information. In step 215, over a suitable data communications link, the voice server can query the HTTP server. The voice server can formulate a query using one or more call parameters such as the called number and/or the calling number to be sent to the HTTP server.

In step 220, the HTTP server can determine a server side program to be executed based upon the call parameters specified in the received query. According to one embodiment of the present invention, associations of called numbers and server side programs can be stored. Responsive to a query from the voice browser of the voice server, the HTTP server can match a called number specified in a received query with an associated server side program. The server side program, once determined, can be executed within the HTTP server. As noted, execution of the server side program can result in the dynamic generation of a voice processing script having one or more identifiers included therein which indicate a need for call control functions to be performed for a given call.

In step 225, the HTTP server can send the voice processing script to the voice server. In step 230, the voice processing script can be loaded and executed in a voice browser of the voice server. Accordingly, the voice server can provide various interactive voice response functions to the calling subscriber as dictated by the voice processing script being executed. In step 235, the voice browser can detect a particular tag or identifier of the voice processing script which indicates that one or more call control functions are required for the call. Notably, the voice browser can detect the identifier during execution of the voice processing script or can detect the identifier prior to execution. For example, the voice browser or another component of the voice server can parse the received voice processing script prior to execution to determine whether call control functions will be required to process the call.

In step 240, responsive to detecting the identifier, the call can be transferred to the telephony server for further call processing. Notably, the call need not be transferred immediately upon detection of the identifier. For example, if the identifier is detected during execution of the voice processing script, the call can be transferred upon detection of the identifier or after the voice processing script has finished execution. In the case where the identifier is detected prior to execution of the voice processing script, the call can be transferred after completion of the voice processing script or at a point during execution which corresponds to the location of the identifier within the voice processing script.

In step 245, the telephony server can receive the call and call control instructions from the server side program. Notably, the voice server can terminate involvement with the call. As mentioned, the server side program, in addition to generating the voice processing script, can provide call control instructions to the telephony server. For example, as the query to the HTTP server from the voice server specified one or more call parameters, those call parameters can be associated with instructions the server side program generates and provides to the telephony server. Accordingly, when the telephony server receives a call, for example from the voice server, the call parameters of the received call, which can include parameters such as the called number and the calling number, can be matched against call parameters which are associated with instructions that have been received from the server side program. In step 250, the call can be processed with one or more call control functions specified by the instructions from the server side program.

According to another embodiment of the present invention, the call control function or functions to be performed on a call by the telephony server can be specified by the identifier of the voice processing script. For example, the voice server can provide the identifier to the telephony server as part of the call parameters of the call (telephony signaling information) when the call is transferred. The telephony server can receive the identifier and match the identifier to one or more call control functions. For instance, one or more identifiers can be included in the voice processing script and can be provided to the telephony server, wherein each identifier indicates a call control function to be applied to the call. It should be appreciated that a one to one correspondence of identifiers to call control functions need not be observed, and that each identifier can specify one or more call control functions. Still, the telephony server can utilize a combination of both identifiers received from the voice server as well as instructions received from the server side program executing in the HTTP server to determine one or more call control functions to be applied to a given call.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of linking call control functions of a telephony server with voice processing functions of a voice server using a common server side program comprising:
   receiving a call in the voice server, wherein in response to receiving the call said voice server determines at least one call parameter specified by signaling information corresponding to the received call;
   conveying the at least one call parameter to another server configured to determine and execute a server-side program based upon the at least one call parameter, wherein execution of the server-side program generates a voice processing script;
   conveying the voice processing script from the other server to the voice server;
   executing the voice processing script in the voice server to process the call;
   transferring the call from the voice server to the telephony server if during execution of the voice processing script the voice server detects a call control function identifier in the voice processing script, wherein the call control function identifier identifies a call control function to be performed for completing the call and wherein the telephony server performs the call control function based upon the call control function identifier.

2. The method of claim 1, said executing step further comprising:
   loading and executing the voice processing script in a voice browser of the voice server;
   wherein said voice browser parses the voice processing script and detects said call control function identifier prior to executing the voice processing script.

3. The method of claim 1, further comprising:
   detecting said call control function identifier during execution of the voice processing script.

4. The method of claim 1, further comprising:
   providing an application development environment for specifying the server side program.

5. A method of linking call control functions of a telephony server with voice processing functions of a voice server using a common server side program comprising:
   providing a server side program that links call control functions of a telephony server with voice processing functions of a voice server, wherein the server side program executes within a server other than the voice server and other than the telephony server;
   executing the server side program to generate a voice processing script;

providing the voice processing script to the voice server for execution;

executing the voice processing script within the voice server;

transferring the call from the voice server to the telephony server if during execution of the voice processing script the voice server detects a call control function identifier in the voice processing script; and performing in the telephony server the call control function based upon the call control function identifier, the call control identifier being transferred to the telephony server prior to performance of the control function.

6. The method of claim 5, further comprising:

loading and executing the voice processing script in a voice browser of the voice server;

wherein said voice browser parses the voice processing script and detects said call control function identifier prior to executing the voice processing script.

7. The method of claim 5, further comprising:

detecting said call control function identifier during execution of the voice processing script.

8. The method of claim 5, further comprising:

providing an application development environment for specifying the server side program.

9. A machine readable storage, having stored thereon a computer program having a plurality of code sections executable by a machine for causing the machine to perform the steps of:

receiving a call in a voice server, wherein in response to receiving the call, said voice server determines at least one call parameter specified by signaling information corresponding to the received call;

conveying the at least one call parameter to another server configured to determine and execute a server-side program based upon the at least one call parameter, wherein execution of the server-side program generates a voice processing script;

conveying the voice processing script from the other server to the voice server;

executing the voice processing script in the voice server to process the call;

transferring the call from the voice server to a telephony server if during execution of the voice processing script the voice server detects a call control function identifier in the voice processing script, wherein the call control function identifier identifies a call control function to be performed for completing the call and wherein the telephony server performs the call control function based upon the call control function identifier.

10. The machine readable storage of claim 9, said executing step further comprising:

loading and executing the voice processing script in a voice browser of the voice server;

wherein said voice browser parses the voice processing script and detects said call control function identifier prior to executing the voice processing script.

11. The machine readable storage of claim 9, further comprising:

detecting said call control function identifier during execution of the voice processing script.

12. The machine readable storage of claim 9, further comprising:

providing an application development environment for specifying the server side program.

13. A machine readable storage, having stored thereon a computer program having a plurality of code sections executable by a machine for causing the machine to perform the steps of:

providing a server side program that links call control functions of a telephony server with voice processing functions of a voice server, wherein the server side program executes within a server other than the voice server and other than the telephony server;

executing the server side program to generate a voice processing script;

providing the voice processing script to the voice server for execution;

executing the voice processing script within the voice server;

transferring the call from the voice server to the telephony server if during execution of the voice processing script the voice server detects a call control function identifier in the voice processing script; and performing in the telephony server the call control function based upon the call control function identifier, the call control identifier being transferred to the telephony server prior to performance of the control function.

14. The machine readable storage of claim 13, further comprising:

loading and executing the voice processing script in a voice browser of the voice server;

wherein said voice browser parses the voice processing script and detects said call control function identifier prior to executing the voice processing script.

15. The machine readable storage of claim 13, further comprising:

detecting said call control function identifier during execution of the voice processing script.

16. The machine readable storage of claim 13, further comprising:

providing an application development environment for specifying the server side program.

17. A call processing environment comprising:

a communications network server configured to determine and execute a server-side program based upon at least one received call parameter specified by signaling information corresponding to a call, wherein execution of the server-side program generates a voice processing script;

a voice server configured to determine the at least one call parameter specified by the signaling information from the call when the call is received by the voice server, execute the voice processing script to process the call, and transfer the call if during execution of the voice processing script the voice server detects a call control function identifier in the voice processing script, the call control function identifier identifying a call control function to be performed for completing the call; and a telephony server configured to receive the call when the call is transferred by the voice server and to execute the call control function for the call under the direction of the server side program.

18. The system of claim 17, further comprising an application development environment for generating the server side program.

19. The system of claim 17, wherein the voice processing script includes a plurality of call control function identifiers indicating that different call control functions needed to process the call.

20. The system of claim 17, wherein the voice server is configured to detect the identifier of the voice processing script prior to executing the voice processing script.

21. The system of claim 20, wherein the voice server provides the identifier to the telephony server.

22. The system of claim 21, wherein the telephony server is configured to determine the call control function from the identifier received from the voice server.

23. The system of claim 17, wherein the telephony server is configured to determine the call control function from information received from the server side program.

* * * * *